E. R. CALTHROP.
PARACHUTE.
APPLICATION FILED NOV. 9, 1918.

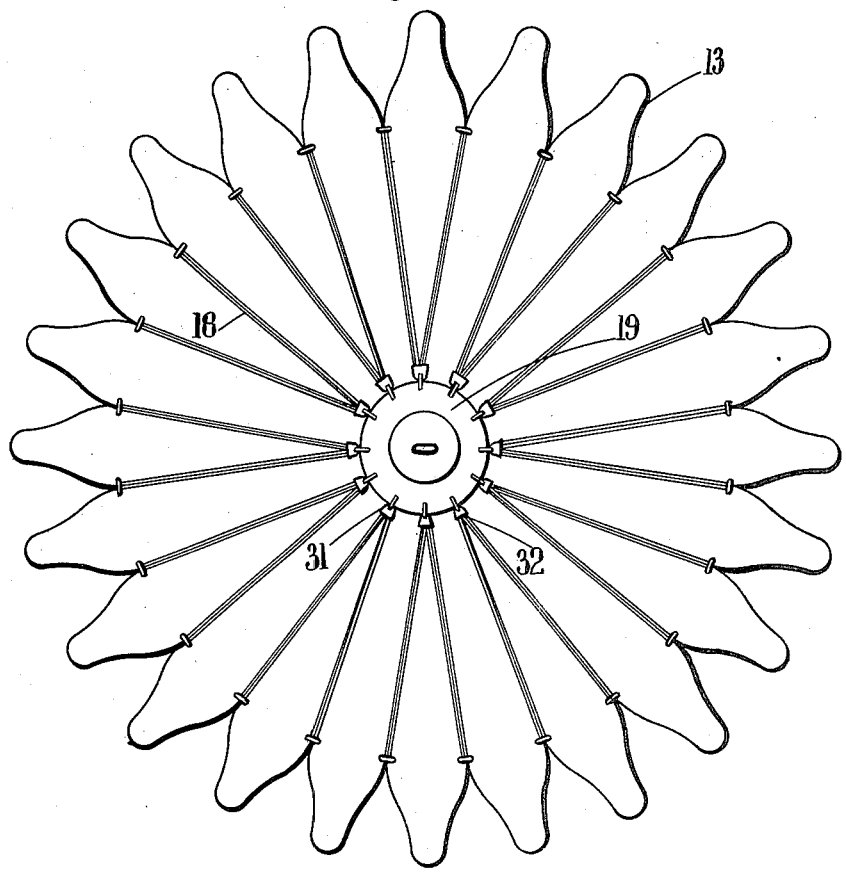
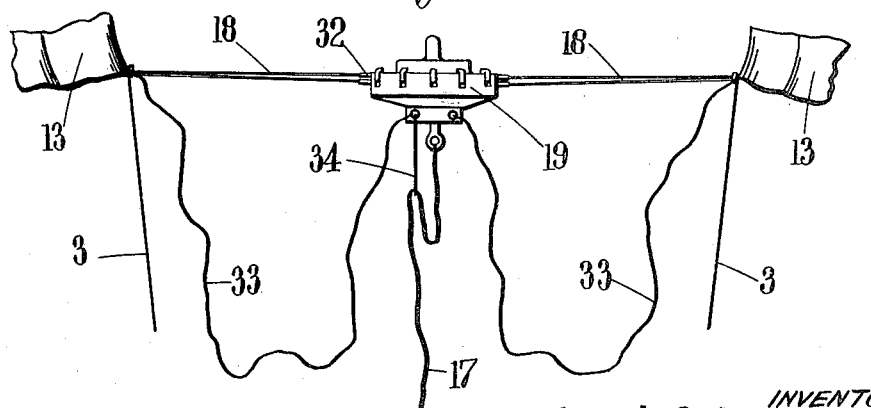

1,299,123.

Patented Apr. 1, 1919.
3 SHEETS—SHEET 2.

Everard Richard Calthrop
INVENTOR by Laurence Langner
Attorney

E. R. CALTHROP.
PARACHUTE.
APPLICATION FILED NOV. 9, 1918.

1,299,123.

Patented Apr. 1, 1919.
3 SHEETS—SHEET 3.

Everard Richard Calthrop
INVENTOR by Lawrence Langner
Attorney

UNITED STATES PATENT OFFICE.

EVERARD RICHARD CALTHROP, OF LONDON, ENGLAND, ASSIGNOR TO E. R. CALTHROP'S AERIAL PATENTS LIMITED, OF LONDON, ENGLAND.

PARACHUTE.

1,299,123.   Specification of Letters Patent.   Patented Apr. 1, 1919.

Original application filed April 19, 1918, Serial No. 229,628. Divided and this application filed November 9, 1918. Serial No. 261,825.

*To all whom it may concern:*

Be it known that I, EVERARD RICHARD CALTHROP, a subject of the King of Great Britain, residing at London, in the county of Middlesex, England, have invented new and useful Improvements Relating to Parachutes, of which the following is a specification.

This invention has reference to parachutes adapted to be carried by aerial craft to afford a ready means whereby the pilot may descend safely to the ground in an emergency and is a division of the subject matter of my co-pending application Serial No. 229,628 filed 19th April 1918.

More particularly the invention relates to devices of the kind in which the parachute is compactly nested within or on a container or support from which it is freed on the application of the load in such a manner that the folds or plaits of the parachute body are released successively from the periphery toward the center in ordered sequence so as to insure the trapping of a column of air and thereby render certain the complete or full expansion of the parachute body.

The use of launching devices of this kind have demonstrated that a parachute when released therefrom opens practically instantaneously and the load is brought slowly and safely to the ground. It is however conceivable that this rapid expansion of the parachute in immediate proximity to the aircraft from which it is released might in some circumstances, prove rather a disadvantage than otherwise for example in the case of the airship or other craft bursting into flame from any cause the parachute might be damaged before it could clear the burning structure and it is the primary object of the present invention to provide a parachute launching device which while insuring the eventual certain opening of the parachute body to support the load is adapted to defer the complete opening and expansion of the parachute for a sufficient time to enable it to fall rapidly for a sufficient distance to be well clear of the aircraft from which it is released.

To this end the invention comprises means for controlling the mouth of the parachute body so as to enable the fall of the parachute to be regulated the preliminary fall or high speed drop being determinable by means operable by the airman and the after descent or drop being thereby subject to retardation by the subsequent full expansion of the parachute body the operation of the said means. releasing and allowing of the complete opening and expansion of the mouth of the said body.

I will now describe my invention with reference to the accompanying drawings in which:—

Figure 1 is a bottom plan view of a parachute body showing an embodiment of the present invention.

Fig. 2 shows diagrammatically in side view the releasing means adapted for use with the arrangement illustrated in Fig. 1 positioned in operative relation to the parachute body.

Fig. 4 is a diagrammatic view hereinafter more particularly referred to.

In my parent application the means described are of such a character that when the aviator throws himself from the aircraft the mouth of the parachute will be expanded sufficiently to entrap the requisite amount of air to insure its eventual complete expansion and after having fallen a distance certain readily rupturable cords are automatically severed the parachute body thereupon being free to complete its full expansion. In the present application however the complete opening of the mouth of the parachute body is under the control of the aviator so that he may determine the most advantageous moment when the restraining influences operating upon the open mouth of the parachute shall be removed to permit of the full expansion of the parachute body and in the means I have devised for accomplishing this object when the parachute is launched the mouth thereof is allowed to open a certain distance sufficient only to entrap the necessary air to insure its subsequent complete expansion and to restrain the complete expansion of the parachute until the functions of the means employed for exercising such restraint are interrupted by the direct act of the aviator.

Figure 3:
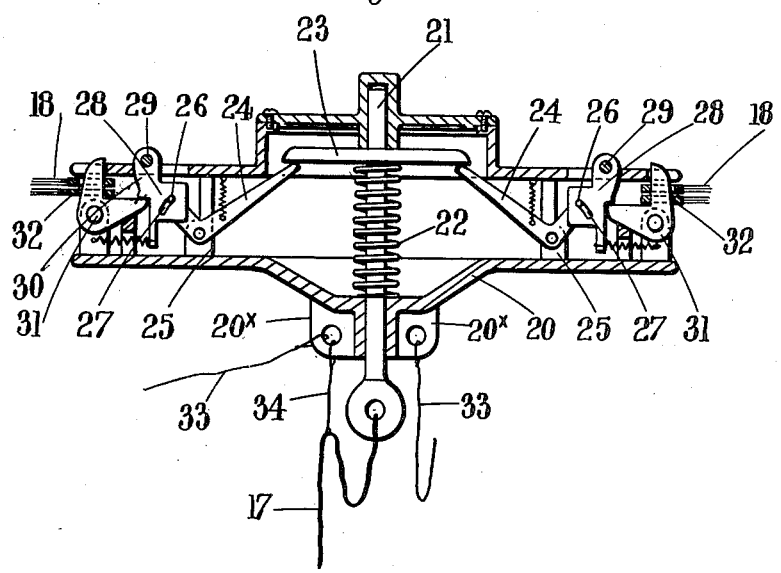
Fig. 3 is a vertical section on a larger scale of the releasing device shown in Fig. 2.

Referring now to Figs. 1 and 2 it will be seen that the periphery of the parachute body 13 from which the rigging tapes 3 extend is connected by tapes 18 to a centrally arranged releasing device 19, the construction of which will be better understood from an inspection of Fig. 3. It comprises an appropriate casing 20 in which is slidably mounted a spindle or stem 21 surrounded by a spring 22 and carrying a disk 23 beneath the edge of which engages the ends of the bell crank levers 24 pivotally supported by lugs 25 on the casing 20. The short arm of each of the levers 24 carries a pin 26 which engages in an arcuate slot 27 formed in a plate 28 pivotally mounted on the casing 20 as at 29. The plates 28 are each formed with a projection or tooth 30 beneath which one arm of each of the detents 31 engages, the other arm of said detents being engaged in slotted plates 32 carried by the ends of each of the aforesaid tapes 18. As will be evident from a consideration of Fig. 3 when the spindle 21 is pulled downwardly by the pilot actuating the rope 17 the long arms of the levers 24 will be depressed turning the plates 28 about their pivots 29 freeing the detents 31 and allowing the plates 32 to slip off the detents thus simultaneously releasing all the tapes 18 and permitting the mouth of the parachute to expand to its full extent. Alternatively instead of providing separate tapes 18 between the periphery of the parachute body and the central release device 19 I may provide loops or rings upon the rigging or main tapes 3 at a suitable distance from the said periphery and engage said loops or rings with the detents 31.

To prevent the releasing device 19 falling upon the pilot when all the tapes 18 are released said device is held suspended by the cords 33 which extend from the parachute body to lugs 20ˣ on the under side of the casing 20 (see Figs. 2 and 3).

To prevent accidental operation of the releasing device 19 I prefer to provide a "breaking piece" or rupturable connection 34 between a portion of the actuating rope 17 and the device 19 so that a pull on said rope will only be effective after the breaking piece 34 is ruptured.

Figure 4:
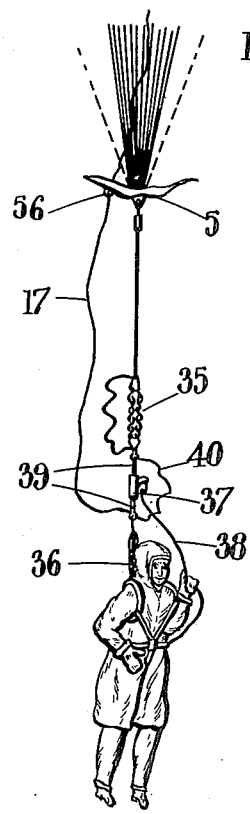

It will be apparent that the requisite pull exerted by the pilot upon the rope 17 to render the parachute fully operative will be a comparatively heavy one and it may in some circumstances be desirable to provide means whereby a light pull on the part of the pilot will be sufficient to bring about the desired sequence of operation. I have illustrated means to this end in Fig. 4 wherein the pilot is shown as descending at the first or high speed drop and about to cause the operation of the various instrumentalities whereby the full expansion of the parachute will be effected. Interposed between the shock absorber 35 and the pilot's harness 36 is a supplementary releasing device 37 which is adapted to be actuated by a comparatively light pull upon the cord 38 so as to sever the connection 39. Upon this occurring the pilot will drop a short distance so that his weight is taken by the rope 40 with the result that a pull is effected upon the cord 17 and the release gear 19 operated.

To safeguard the operating cord 17 against entanglement when the whole launching device is in the inoperative or nested condition it is preferably coiled or stowed in a suitable pocket 56 on the lower waterproof cover 5 pertaining to the container (not shown) for the parachute.

Figure 5:
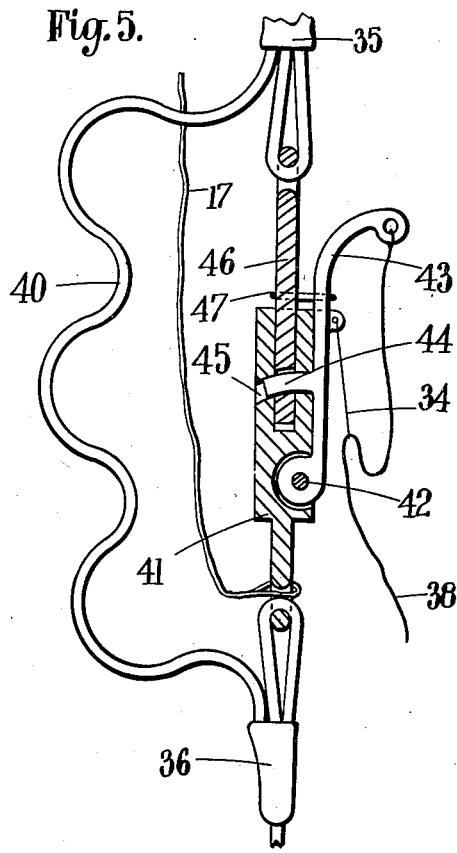
Fig. 5 illustrates a form of releasing device for use with the arrangement shown in Fig. 4.

Referring to Fig. 5 the supplementary releasing device 37 illustrated therein on a larger scale comprises a block 41 which is attached to the pilot's harness 36 and has pivoted therein as at 42 a lever 43 a tooth on the latter taking into an aperture 45 in said block and also engaging a bar 46 secured to the shock absorber 35. The operating cord 38 is connected to the lever 43, a breaking piece 34 being provided to prevent accidental operation of the device. The lever 43 is retained in the position shown by a light rubber band 47. Upon the pilot exerting a pull upon the cord 38 the said breaking piece 34 and band 47 will be broken the lever 43 deflected or turned about its pivot 42 and the tooth 44 disengaged from the bar 46 the two parts namely 41 and 46 being thereby allowed to separate and the weight of the pilot to be exerted upon the rope 40 with the result previously described.

Figure 6:
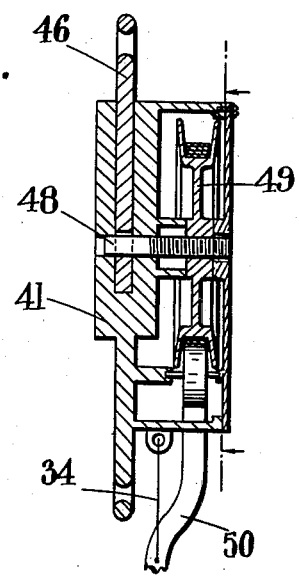
Figs. 6 and 7 represent in vertical section and side elevation respectively another form of releasing device.
Figure 7:
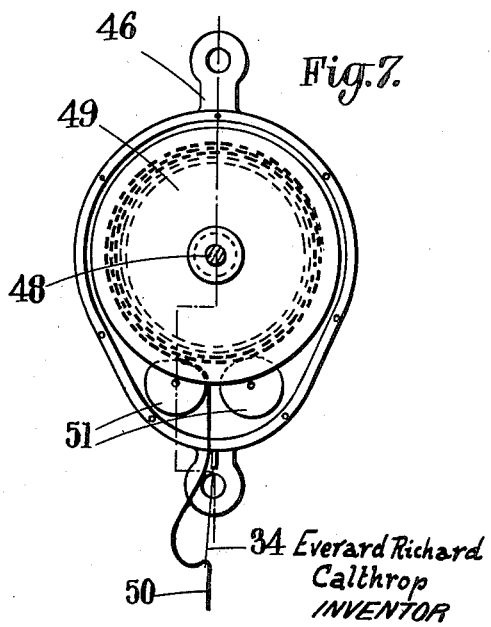

An alternative construction of releasing gear is shown in Figs. 6 and 7. In this construction the block 41 and bar 46 are held in operative relation by a slidably mounted pin 48 in threaded engagement with a wheel 49 about which an operating tape 50 is wound. Said tape is the equivalent of the cord 38 described with reference to Fig. 5 and upon pulling same the wheel 49 will be rotated thus withdrawing the pin 48 from engagement with the bar 46 and allowing the two parts to separate. Rollers 51, preferably of rubber are provided to exercise a "breaking" effect upon the tape 50 wound on the wheel 49 and prevent it becoming loose thereon, and also to guide and assist the unwinding of the tape when it is actuated by the pilot.

What I claim and desire to secure by Letters Patent of the United States is:—

1. In a parachute and launching device the combination with a parachute body of a centrally disposed releasing device and restraining tapes adapted to connect said body with said releasing device and supporting said device and means convenient to the parachutist for operating said releasing device.

2. In a parachute and launching device the combination with the parachute body of a centrally disposed releasing device comprising pivoted detents, pivoted plates for holding said detents, levers for actuating said plates, a spring controlled disk for operating said levers, a stem on said disk, an actuating cord connected with said stem and tapes adapted to engage said detents and connected to the periphery of the mouth of the parachute body.

3. In a parachute and launching device the combination with the parachute body of a centrally disposed releasing device, restraining tapes adapted to connect said body with said releasing device and supporting said device, a supplementary releasing device connected with said centrally disposed releasing device, means convenient to the parachutist for operating said supplementary releasing device and means operatively connecting said supplementary device with said centrally disposed releasing device.

4. In a parachute and launching device the combination with the parachute body of a casing, pivoted detents, pivoted plates for holding said detents, levers for actuating said plates, a spring controlled disk for operating said levers, a stem on said disk, an actuating cord connected with said stem, a supplementary block also connected with said actuating cord, a detachable bar in said block, a lever pivoted in said block and adapted to engage said bar, a cord from said lever to the parachutist and tapes adapted to engage the said detents and connected to the periphery of the mouth of the parachute body.

5. In a parachute and launching device the combination with the parachute body of a centrally disposed releasing device, restraining tapes adapted to connect said body with said releasing device, means convenient to the parachutist for operating said releasing device, safety means between said operating means and releasing device and means depending from said body for supporting said releasing device when said restraining tapes are released.

EVERARD RICHARD CALTHROP.